United States Patent
Robinson

[11] 3,888,422
[45] June 10, 1975

[54] AIR GUN
[75] Inventor: Douglas N. Robinson, Canton, N.C.
[73] Assignee: Dayco Corporation, Dayton, Ohio
[22] Filed: Feb. 8, 1974
[21] Appl. No.: 440,922

[52] U.S. Cl. ............................ 239/512; 239/508
[51] Int. Cl. .................................... B05b 1/26
[58] Field of Search .......... 239/507, 508, 509, 510, 239/512, 503

[56] References Cited
UNITED STATES PATENTS

| | | | |
|---|---|---|---|
| 191,964 | 6/1877 | Holloway | 239/508 X |
| 1,299,958 | 4/1919 | Kermack et al. | 239/512 |
| 2,823,076 | 2/1958 | Nurkiewicz | 239/507 X |
| 3,540,659 | 11/1970 | Mullins et al. | 239/508 |

FOREIGN PATENTS OR APPLICATIONS 15,099  5/1902  United Kingdom ............... 239/510

*Primary Examiner*—M. Henson Wood, Jr.
*Assistant Examiner*—John J. Love
*Attorney, Agent, or Firm*—Reuben Wolk

[57] ABSTRACT

An air gun is provided and comprises a housing, a discharge nozzle extending from the housing, and a safety device for the discharge nozzle with the safety device serving as a shield for the discharge nozzle and as a deflector for air inadvertently exiting the discharge nozzle during routine handling of the air gun. The air gun has means supporting the safety device on the housing allowing movement thereof away from the nozzle during operation of the air gun.

1 Claim, 3 Drawing Figures

AIR GUN

BACKGROUND OF THE INVENTION

There are numerous applications in industry which employ air under pressure for various purposes. For example, in the manufacture of endless power transmission belts, conduits made of elastomeric materials, elastomeric sleeves or tubular blankets for the printing industry, elastomeric sleeves or cots for the textile industry, and the like, it is often necessary to install and remove a tubular elastomeric sleeve on an associated rigid mandrel. Generally, the inside diameter of such a sleeve is sized very close to (usually slightly smaller than) the outside diameter of an associated mandrel on which the sleeve is to be installed making it very difficult to install such a sleeve on the mandrel. However, it has been found that by employing air provided at pressures generally of the order of 100 PSIG from an air gun, it is possible to partially locally expand a sleeve of the character mentioned above to facilitate sleeve installation on and removal from its associated mandrel.

Toward this end, it is desirable that the air gun have a sharp nozzle to facilitate insertion thereof between a sleeve and mandrel yet which is capable of providing a stream of high velocity air between the sleeve and its associated rigid mandrel to partially expand the sleeve and facilitate movement thereof along the mandrel. However, an air gun having such a nozzle may be very dangerous to operate and handle and requires suitable safety means therefor.

SUMMARY

This invention provides an improved air gun of the character mentioned which is particularly adapted for use in installing and removing sleeves from associated mandrels yet has integral safety means. The air gun comprises a housing, a discharge nozzle extending from said housing, and a safety device for said discharge nozzle with the safety device serving as a shield for the discharge nozzle and as a deflector for air inadvertently exiting the discharge nozzle during handling of the air gun. The air gun includes means supporting the safety device on the housing allowing movement thereof away from the nozzle during operation of the air gun.

Other details, uses, and advantages of this invention will be readily apparent from the exemplary embodiments thereof presented in the following specification, claims, and drawing.

BRIEF DESCRIPTION OF THE DRAWING

The accompanying drawing shows a present preferred embodiment of this invention, in which.

DESCRIPTION OF ILLUSTRATED EMBODIMENT

Figure 1:
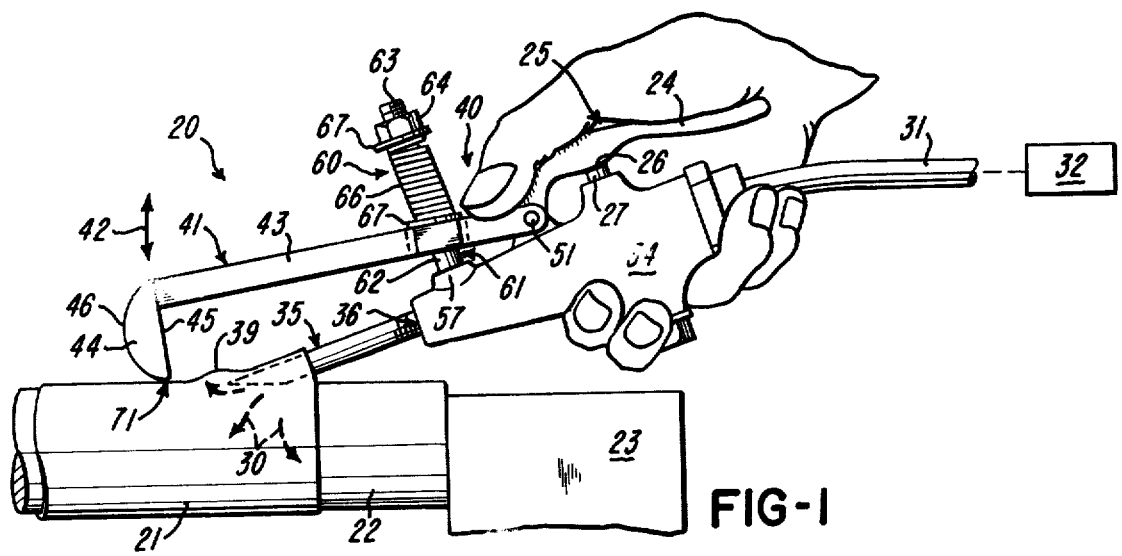
FIG. 1 is a fragmentary perspective view illustrating one exemplary embodiment of the air gun of this invention being utilized to install an elastomeric sleeve on an associated mandrel.

Reference is now made to FIG. 1 of the drawing which illustrates one exemplary embodiment of an air gun of this invention which is designated generally by the reference numeral 20; and, the air gun 20 is a handheld air gun and is shown in this disclosure being used to install a slightly radially expandible tubular member in the form of a sleeve 21 made of an elastomeric material, which will be described hereinafter as being a rubber sleeve 21, on an associated exemplary right circular cylindrical mandrel 22 made of a metallic material. The mandrel has opposite end portions suitably supported on mandrel supports 23 at opposite ends thereof with only one mandrel support 23 being shown in the drawing.

The air gun 20 has a pivoted actuating lever 24 which is adapted to be engaged by a portion of an operator's hand and thumb as illustrated at 25 while the lower portion of the air gun 20 is supported by the other fingers of such hand. The lever 24 has a bearing surface 26 which is adapted to engage an outwardly spring-urged plunger 27 of the air gun 26 to push such plunger 27 within the air gun in a well known manner to open an internal air shut-off valve (not shown) of known conventional construction allowing flow of air, shown by dotted arrows 30, under pressure from the air gun. Because the operation of the lever-operated plunger 27 and its associated internal shut-off valve are so well known they will not be described herein and these components do not comprise a part of this invention.

The air gun 20 may be provided with air under pressure from any suitable source. In this example, the gun 20 is provided with pressurized air through a flexible conduit 31 connected to the gun inlet with the flexible conduit being suitably connected to a source 32 of pressurized air.

Figure 2:
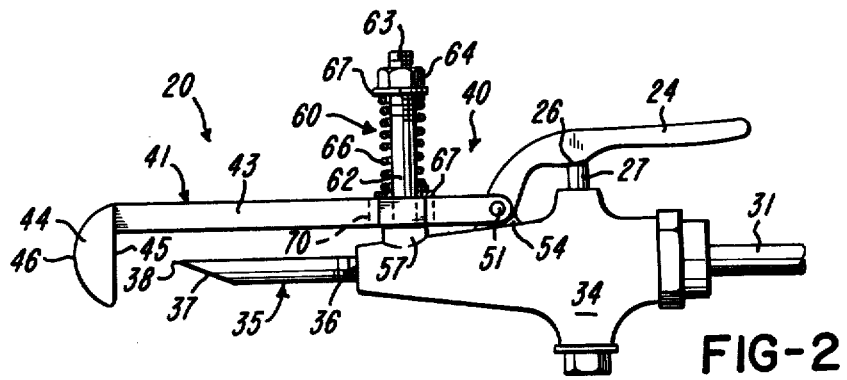
FIG. 2 is a side elevation of the air gun illustrated in FIG. 1.
Figure 3:
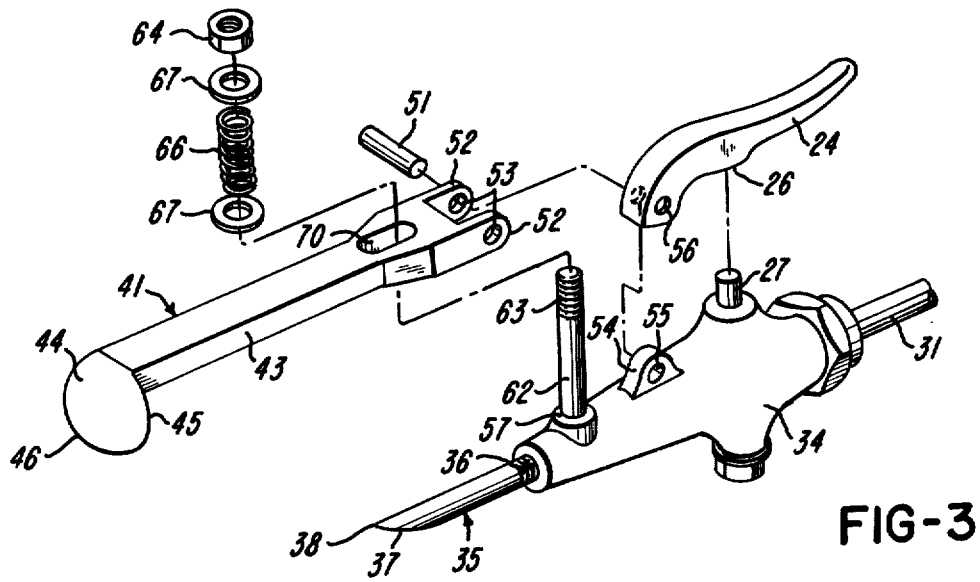
FIG. 3 is an exploded perspective view of certain components of the air gun of FIGS. 1 and 2.

As best seen in FIGS. 2 and 3 of the drawing, the air gun 20 has a housing 34 and a discharge nozzle 35 extending from such housing, and in this example, the discharge nozzle 35 has an inner end portion threadedly fastened within the housing 34 as illustrated at 36. The nozzle 35 also has an inclined portion or wedge-like portion 37 terminating in a comparatively sharp terminal end 38. The end 38 and wedge-like portion 37 are particularly adapted to be easily inserted or wedged between a sleeve, such as the sleeve 21, and an associated mandrel, such as a mandrel 22 upon which such sleeve is to be installed or removed whereupon the lever 24 is actuated to employ air pressure to aid in partially locally expanding the sleeve as shown at 39 for easier movement thereof along the mandrel.

The air gun 20 also has a safety device in the form of an L-shaped member 41 which will be described in detail subsequently and the safety device serves as a shield for the discharge nozzle 35 and as a deflector for high-velocity pressurized air which would discharge from nozzle 35 in the event lever 24 were to be inadvertently actuated during routine handling of the air gun 20. In addition, the air gun 20 has supporting means 40 for supporting the safety device or L-shaped member 41 on the housing 34 allowing movement thereof toward and away from the nozzle 35 as indicated by the double arrow 42 in FIG. 1; and, in particular allowing movement of the safety device 41 away from the nozzle 35 during operation of the air gun 20 to install or remove an elastomeric sleeve from an associated mandrel.

The L-shaped safety device 41 has one leg 43 arranged roughly parallel to the nozzle 35 and another leg 44 extending transverse the leg 43 and with the central portion of the inside surface 45 of the leg 44 being arranged in aligned relation with the nozzle. The central portion of the inside surface 45 of the leg 44 is aligned with the nozzle 35 so that a stream or jet of high velocity air exiting the nozzle 35 during handling of the air gun 20 under conditions other than the normal use thereof to install or remove a sleeve from an associated mandrel would result in air impinging against the inside surface 45 whereby the leg 44 would serve as a deflector for such high velocity air and prevent possible damage to an article or injury to a person struck by the air jet. For safety reasons, the leg 44 also has a comparatively smooth outside arcuate contour 46 which blends smoothly with the leg 43.

As previously mentioned, the air gun 20 has means 40 supporting the safety device or member 41 on the housing 34. The supporting means 40 comprises a pivot in the form of a pivot pin 51 for the inner end portion of the member 41 and the pivot also serves as a pivot for the lever 24. The member 41 has a bifurcate inner end defined by a pair of arms each designated by the reference numeral 52 and each having an opening 53 therein. The housing 34 also has an integral lug 54 extending outwardly therefrom and the pin 51 extends through the openings 53 in the arms 52, through a central opening 55 in the lug 54, and an opening 56 in the lever 24. Thus, the pivot 51 comprising the supporting means 40 pivotally supports the L-shaped member 41 at its bifurcated end.

The supporting means 40 also comprises means yieldingly urging the leg 43 and hence the entire member 41 against a stop 57 provided on the housing 34, and in this example the stop 57 is provided as an integral part of such housing. The stop has a flat bearing surface against which a lower portion 58 of the arm 43 is adapted to engage. The above-mentioned yieldingly urging means is designated generally by the reference numeral 60 and comprises a rod assembly 61 haiving a rod-like member or rod 62 which is suitably fixed to the housing 34 roughly perpendicular to the nozzle 35. The rod 62 has a threaded outer end portion 63 which threadedly receives a threaded nut 64 and a spring device in the form of a compression spring 66 is provided and acts between the nut 64 and the leg 43 of the L-shaped member 41 to thereby urge the leg 43 against the stop 57 with a controlled force determined by the force exerted by the compression spring. In addition, it will be seen that the rod assembly 61 has a pair of washers each designated by the reference numeral 67 arranged at opposite ends of the spring with one of the washers engaging the top portion of the leg 43 of member 41 and the other washer engaging the bottom surface of the nut 64.

To allow free pivoting movement of the L-shaped member 41 about the pivot pin 51 it will be seen that the L-shaped member has an elongated slot 70 provided therein; and, the slot 70 has its elongated dimension extending along the length of the leg 43.

Thus, it is seen that the air gun 20 has a safety device 41 which is normally held by its compression spring 66 so that it serves the dual purpose of shielding the nozzle 35 when the air gun 20 is not being used for its intended purpose and the safety device 41 also serves as an air deflector so that a jet of high velocity air exiting the nozzle 35 due to inadvertent actuation of lever 24 will be rendered substantially harmless. When the air gun 20 is not in use the safety device 41 also shields the sharp terminal end 38 of the nozzle 35 to prevent injury to an operator or other persons who might otherwise come into contact therewith. However, once it is desired to operate the air gun to install or remove an associated sleeve, such as the rubber sleeve 21 of FIG. 1, for example, the safety device 41 is easily pivoted out of position by engaging the outer end portion of the leg 44 against the sleeve 21 as shown at 71 in FIG. 1 to override spring 66 and pivot the member 41 out of position, whereupon the lever 24 may be actuated to discharge high velocity air from the nozzle 35 and enable easier movement of the sleeve 21 along mandrel 22 in the manner previously described.

In this disclosure of the invention the mandrel 22 and sleeve 21 are shown as being of comparatively small diameter; however, it is to be understood that the sleeve 21 and its associated mandrel may be of any size in common use throughout industry.

While present exemplary embodiments of this invention, and methods of practicing the same, have been illustrated and described, it will be recognized that this invention may be otherwise variously embodied and practiced within the scope of the following claims.

What is claimed is:

1. An air gun comprising a housing having an integral stop thereon; a discharge nozzle extending from said housing and having a wedge-like end portion terminating in a comparatively sharp terminal end; a safety device for said discharge nozzle comprising a roughly L-shaped member with a first leg having an elongated slot therein and arranged roughly parallel to said nozzle, and a second leg having an arcuate outer surface secured to one end of and extending transversely of said first leg, the other end of said first leg being bifurcated; said safety device serving as a shield for said discharge device and as a deflector for air which is inadvertently discharged from said nozzle, the central portion of said first leg being normally in aligned relation with said nozzle when serving as a deflector; means supporting said safety device on said housing allowing movement thereof away from said nozzle during operation of said air gun, said means comprising a supporting lug on said housing and a pivot pin extending through said lug and the bifurcated end of said first leg; a rod assembly fixed to said housing roughly perpendicular to said nozzle; and a compression spring acting between said rod assembly and said L-shaped member to urge said first leg against said stop, said rod assembly including a rod passing through the elongated slot of said first leg to allow movement of said L-shaped member relative to said nozzle.

* * * * *